United States Patent [19]

Leiter et al.

[11] 3,807,646
[45] Apr. 30, 1974

[54] ASBESTOS CONDITIONING AND TRANSPORTING APPARATUS

[76] Inventors: Carol N. Leiter; Gerald E. Leiter, both of 222 W. Crawford St., Van Wert, Ohio 45891

[22] Filed: Feb. 23, 1972

[21] Appl. No.: 228,506

[52] U.S. Cl.................. 241/60, 241/154, 241/188 R
[51] Int. Cl. ............................................ B02c 13/00
[58] Field of Search ............ 241/152, 154, 60, 136, 241/138, 188, 190, 191, 187, 101.5, 292.1

[56] References Cited
UNITED STATES PATENTS

| | | | |
|---|---|---|---|
| 2,989,252 | 6/1961 | Babb | 241/60 |
| 2,291,038 | 7/1942 | Hazle | 241/152 R |
| 2,894,697 | 7/1959 | Panning | 241/190 |
| 3,061,206 | 10/1962 | Matter | 241/60 |
| 2,889,862 | 6/1959 | Williamson | 241/190 |

FOREIGN PATENTS OR APPLICATIONS

| | | | |
|---|---|---|---|
| 155,616 | 8/1952 | Australia | 241/192 |

Primary Examiner—Granville Y. Custer, Jr.
Assistant Examiner—Robert C. Watson
Attorney, Agent, or Firm—Gust, Irish, Lundy & Welch

[57] ABSTRACT

An apparatus for conditioning asbestos fibers comprising in combination a hopper having longitudinally displaced inlet and outlet openings, first means mounted within the hopper for disjoining fibrous material loaded therein and second means mounted within the hopper for disjoining fibrous material loaded therein and for moving the material longitudinally through the hopper from the inlet opening to the outlet opening thereof. A first duct communicates with the outlet opening, and there are third means disposed within the second duct for further disjoining the material discharged from the hopper through the hopper outlet opening. An air lock is coupled to the duct for passing the material to a discharge opening, and pressure fluid means are provided for forcibly discharging the material from the discharge opening.

3 Claims, 7 Drawing Figures

ASBESTOS CONDITIONING AND TRANSPORTING APPARATUS

BACKGROUND OF THE INVENTION

1. Field of the Invention

The invention relates to an apparatus for preparing fibrous materials for use and more particularly to such an apparatus which substantially disjoins or "fluffs" asbestos fibers and discharges the same under pressure.

2. Description of the Prior Art

Asbestos is a versatile product which is applied to numerous and diverse uses ranging from insulation to a filler material for asphalt pavement. In its refined state, asbestos fiber comprises very fine, elongated fibers and a relatively small mass of the material occupies a relatively large volume. However, in the process of packaging and storage of the material, the fibers can become entangled and otherwise compacted. Further, for reasons of economy of space and ease of handling, refined and milled asbestos fibers are frequently compacted under substantial pressure into generally rectangular blocks of material. Nonetheless, when it is desired to apply the asbestos fibers to many uses such as, for example, a filler for paint or asphalt paving material, it is desirable that the fibers be as fully and completely disjoined, "fluffed", or otherwise to have the fibers therein separated thereby to obtain the most complete utilization of the desirable characteristics of the material.

When the asbestos fibers are being applied to a particular use, it is also desirable to convey or transport the fibers in a closed vessel such as a pipeline, conduit, or duct, both for ease of handling and to minimize the production of asbestos dust.

To these ends, it is desirable to provide an apparatus which will accept asbestos fibers in a relatively compacted state and substantially disjoin or separate the individual fibers preparatory to use thereof. It is further desirable that the apparatus also provide a means for forcibly discharging and moving the asbestos fibers through a transporting means such as a closed duct.

Also, asbestos fibers are refined and graded with the different lengths and grades of the material being best suited for the different uses thereof. It is therefore also desirable that an apparatus for fluffing or conditioning the asbestos fibers not chop, sever, or otherwise change the length, and thereby the grade and quality of the fibers.

SUMMARY OF THE INVENTION

The present invention is such an apparatus for conditioning and conveying asbestos fibers. The apparatus comprises in combination a hopper adapted to receive asbestos fibers in a compacted condition. The hopper includes an outlet opening and first means are disposed within the hopper for substantially disjoining the asbestos fibers. Also disposed within the hopper is a second means for simultaneously disjoining the asbestos fibers and moving them in the hopper towards the outlet opening. A duct communicates with the outlet opening of the hopper and has therein a third means for force feeding and further disjoining the asbestos fibers. An air lock feeder which includes a hollow pressure chamber serves as a means for transferring the asbestos fibers from the duct to a discharge opening in the chamber. Also provided is a means for applying pressure fluid to the chamber for forcibly discharging the fibers therefrom. The aforementioned air lock means further includes means for preventing the passage of pressure fluid from the chamber upwardly through the duct and hopper.

In a specific embodiment, a common drive means is provided for operating the first, second and third disjoining means and the air lock means.

It is therefore an object of the invention to provide an apparatus for disjoining asbestos fibers preparatory to use thereof.

It is another object of the invention to provide such an apparatus which separates asbestos fibers without reducing the length of, or otherwise mutilating, the fibers.

It is still another object of the invention to provide such an apparatus which conveys and forcibly discharges the conditioned fibers.

It is still another object of the invention to provide such an apparatus which includes means for disjoining fibrous material without causing longitudinal movement of the material through the hopper.

It is yet another object of the invention to provide such an apparatus which conditions and conveys asbestos fibers while producing a minimum of dust and debris.

It is still another object of the invention to provide such an apparatus which is rugged and reliable in operation.

BRIEF DESCRIPTION OF THE DRAWING

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF A SPECIFIC EMBODIMENT

Figure 1:
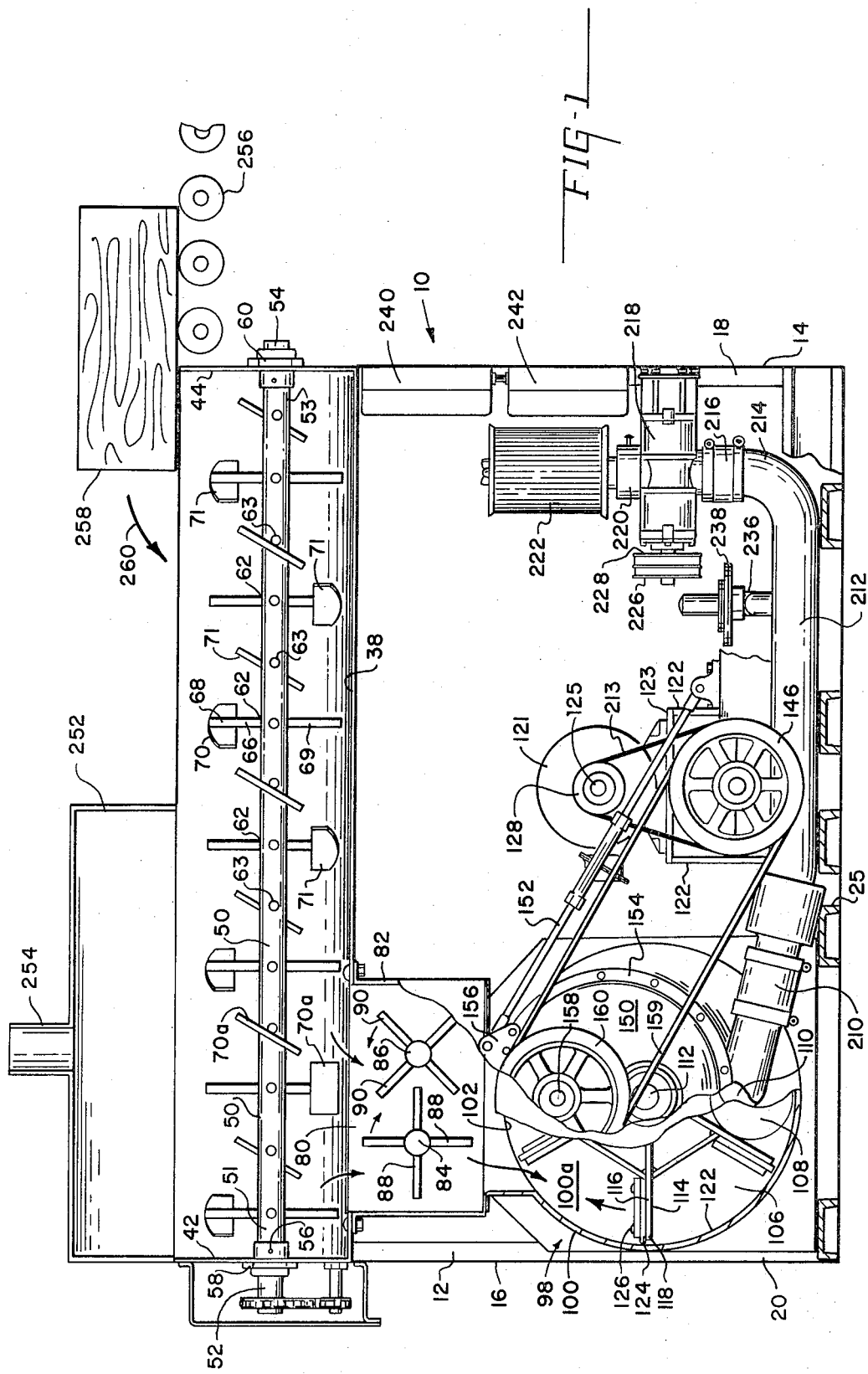
FIG. 1 is a side plan view, partially cut away, showing an asbestos conditioning and transporting apparatus in accordance with the present invention.

Referring now to the drawings there is illustrated an asbestos fiber conditioning and transporting apparatus indicated generally at 10 which comprises a generally rectangular, skeletal frame 12 which includes side members 14 and 16 and vertically extending corner posts 18, 20, 22, and 24. A plurality of transverse base members extend between side members 14 as at 25 and are secured as by welding.

A rigid, perimetral frame 26 fabricated from angle iron is mounted to the upper ends of corner posts 18 through 24 and includes a longitudinal member 28

Figure 2:
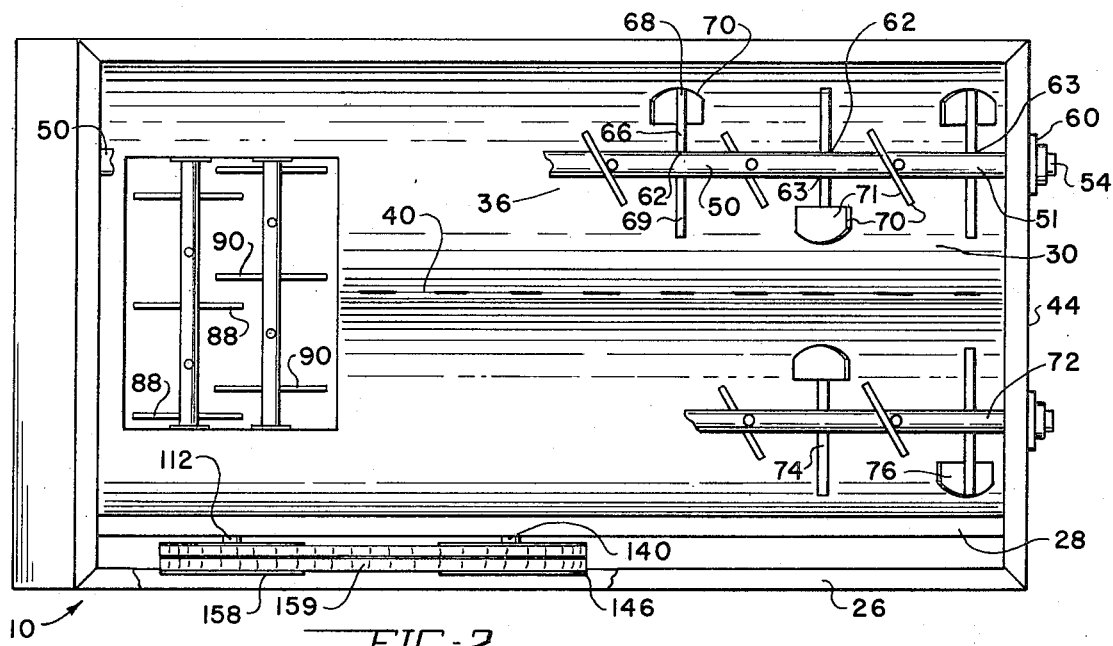
FIG. 2 is a top plan view of the apparatus.

(FIG. 2 only). Supported on perimetral frame 26 is a hopper 30 having tapered sidewalls 32, 34 and which is divided longitudinally into two semi-cylindrical trough portions 36 and 38 by a divider 40, the ends of hopper 30 being closed with suitable end walls 42, 44.

A first means for disjoining asbestos or the like fibers includes an elongated, hollow shaft 50 fitted at its opposite ends 51, 53 (FIG. 1 only) with stub shafts 52 and 54, stub shafts 52, 54 being secured by means of taper pins as at 56, and shaft 50 is rotatably mounted to the end walls 42, 44 of hopper 30 by means of suitable sealed bearing assemblies 58 and 60.

Holes 62 and 63 are formed in shaft 50 in two orthogonally disposed rows, holes 62, 63 extending through shaft 50 in a direction perpendicular to the axis thereof. The two rows of holes 62, 63 are interlaced. That is, longitudinally successive ones of holes 62, 63 lie in alternate ones of the rows, respectively. A cylindrical rod or tine 66 having opposite ends 68, 69 is received through each hole 62 and 63 with the opposite ends thereof extending symmetrically, radially outwardly from shaft 50. The tines 66 are secured to the shaft 50 as by welding.

Fixedly secured, again as by welding, to one end only of each tine 66 is an elongated blade element 70, each blade element 70 having a generally flat face surface 71. The blades 70 have an arcuate outer edge as shown to provide clearance between the blades 70 and the hopper 30. As best seen in FIG. 1, the blades 70 secured to the tines in holes 62 are, in succession, secured to the diametrically opposite ends 68, 69, respectively, of the tines 66. Similarly, the blades 70 secured to the tines in holes 63 are, in succession, to the diametrically opposite ends of the tines 66. Stated otherwise, moving longitudinally along shaft 50 from one end to the other, each blade 70 is displaced by 90° with respect to both the preceding and succeeding blades 70. It will further be observed that each of the blades 70 has its face surface 71 disposed at an angle with respect to a plane extending perpendicular to shaft such that surfaces 71 are disposed substantially along an imaginary screw type conveyor having shaft 50 as its axis. By reason of this structure, as the shaft 50 rotates, the blade 70 will, in the manner of a screw type conveyor, force any material within the hopper 30 through the hopper 30 in a direction parallel to shaft 50. As will be explained below, shaft 50 is rotated in a direction such that material within the hopper 30 will be moved from right to left as viewed in FIG. 1.

Figure 4:
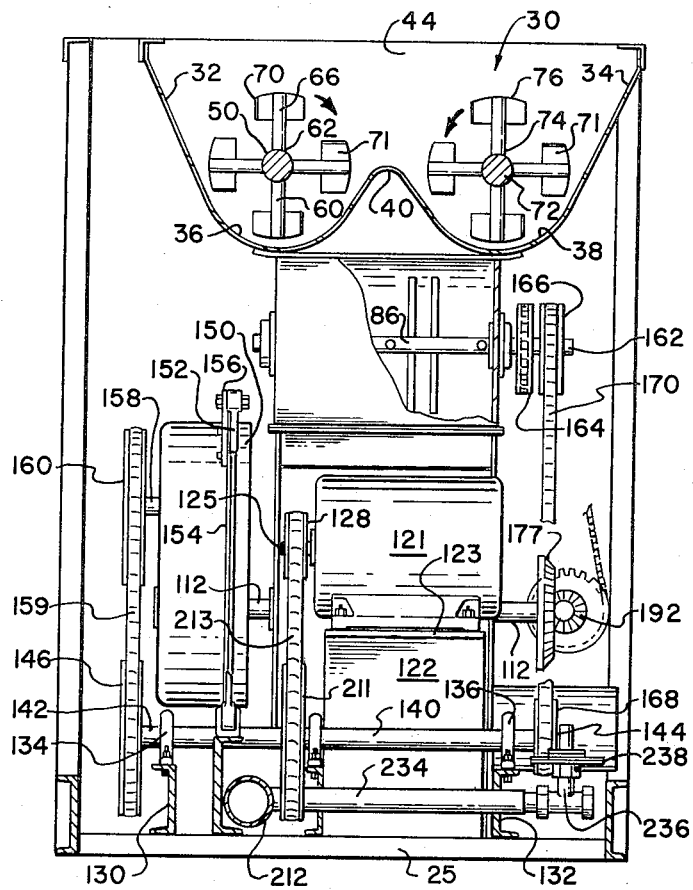
FIG. 4 is an end plan view of the apparatus as viewed from the left in FIG. 1 and partially cut away to show the pressure regulating means.

A second elongated shaft 72, also a part of the first disjoining means extends parallel to and is laterally spaced-apart from shaft 50 as best seen in FIGS. 2 and 4. Shaft 72 is also provided with a plurality of tines 74 and each tine 74 is provided at one end with a blade 76. Shaft 72, tines 74, and blades 76 are identical to shaft 50, tines 66, and blades 70 with the exception that blades 76 are oriented substantially along an imaginary screw type conveyor which is oppositely spiraled to that followed by blades 70.

An outlet opening 80 is provided in the bottom of hopper 30 adjacent one end thereof and a rectangular duct 82 is secured to hopper 30 in communication with outlet opening 80 as shown. A pair of tined shafts 84, 86 are transversely rotatably mounted within duct 82. As best seen in FIG. 2, the tines 88, 90 of tined shafts 84, 86, respectively, extend radially outwardly of the shafts 84, 86, in longitudinally spaced-apart relationship with the tines 88, 90 being spaced such that they traverse paths that are closely adjacent but wherein the tines 88, 90 do not make physical contact with each other.

An air lock means is provided and includes a hollow cylindrical chamber 100 having an inlet opening 102 in the top surface thereof and its opposite ends closed with suitable end plates 104, 106. There is a discharge opening 108 in end wall 106 and a pressure fluid inlet port 110 in the opposite end wall 104, discharge opening 108 and pressure fluid port 110 being disposed with their axes in parallel alignment.

An air lock shaft 112 is coaxially, rotatably journaled within chamber 100 and a plurality of generally flat, rectangular vanes 114 are fixedly secured to shaft 112 as by welding, vanes 114 extending radially outwardly from shaft 112 as shown. Vanes 114 are dimensioned such that their perimetral surfaces 116, 118, and 120 are in close proximity to the inside wall 122, and end walls 104, 106 of chamber 100. To the perimetral edges 116 through 120 of vanes 114 are secured resilient sealing strips 124, these being maintained in position by a suitable retaining plate and threaded fasteners as at 126. It will be observed that the positioning of the vanes 114 is such that, as will be explained in more detail below, pressure fluid applied to the chamber 100 through pressure fluid port 110 can pass freely past vanes 114 and be exhausted through discharge opening 108. Simultaneously, the vanes 114 with their attendant seals 124 prevent the passage of pressure fluid from the pressure fluid inlet port 110 upwardly through chamber 100 to inlet opening 102. It will further be observed that as the vanes 114 are rotated within the chamber 100, material entering chamber 100 through inlet opening 102 thereof will be carried downwardly from the inlet opening 102 to a position adjacent the discharge opening 108.

Drivingly rotating shafts 50 and 72, shafts 84, 86 and the air lock shaft 112, is a first electric motor 121 which is secured to transverse frame members 24 by means of a pair of upstanding stanchion members 122 and mounting plate 123, stanchions 122 and plate 123 being welded together and to transverse frame members 24 as shown. Motor 121 includes an output shaft 125 to which is fitted a first sheave or the like 128.

A pair of longitudinally disposed spacing members 130, 132 are welded to transverse frame members 24 and a pair of pillow blocks 134, 136 are secured to the upper surfaces thereof, respectively, the axes of the pillow blocks 134, 136 being disposed parallel to transverse frame members 24 as shown. A jack shaft 140 having opposite ends 142, 144 is rotatably received in pillow blocks 134, 136 with its ends 142, 144 extending outwardly therefrom, respectively. Drivingly connected to end 142 of shaft 140 is a second sheave 146.

A gear box or speed-reducing assembly 150 is drivingly coupled to drive shaft 112 and supported thereon, gear box 150 being restrained against rotational movement by a tie rod 152 which is secured between a bolt flange 154 on gear box 150 by means of a suitable bracket 156 and frame side member 14. The input shaft 158 of gear box 150 has drivingly coupled thereto a third sheave 160 and an endless belt 159 is trained about second sheave 146 and third sheave 160.

Shaft 86 (FIG. 4) of the second disjoining means has an outwardly extending end 162 to which is fitted a sprocket 164 and a fourth sheave 166. End 144 of jack shaft 140 is similarly drivingly fitted with a fifth sheave 168 and a second drive element or belt 170 is trained about sheaves 166, 168 as shown. Shaft 84 is also fitted with a sprocket 174 (FIG. 3), sprocket 174 having a smaller pitch diameter than sprocket 164 and sprocket 164, 174 are drivingly coupled by means of a roller chain 176.

Figure 3:
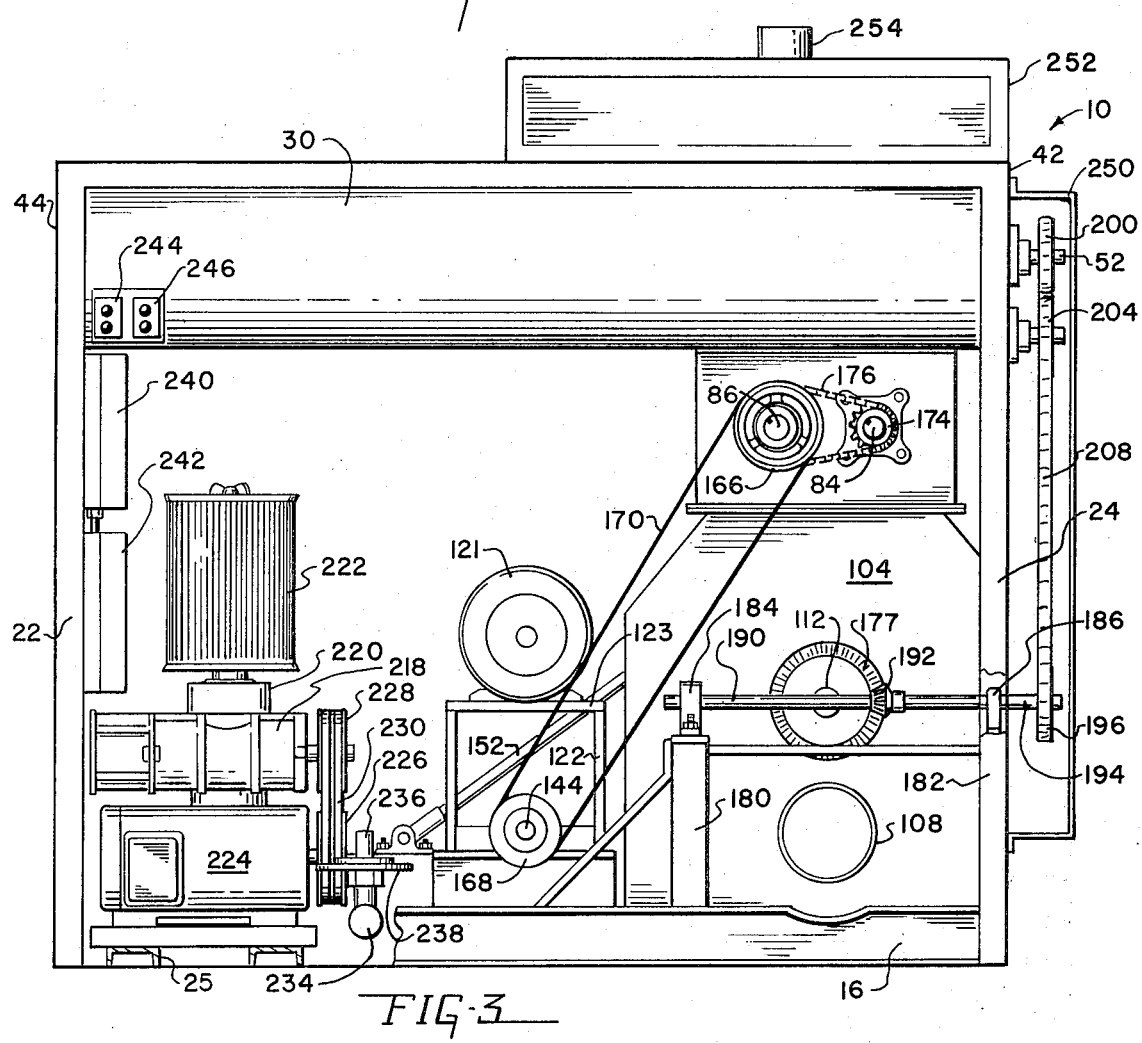
FIG. 3 is a side plan view of the apparatus as viewed from the opposite side as in FIG. 1.

The end of air lock shaft 112 opposite gear box 150 has drivingly connected thereto a miter gear 177 (FIG. 3). A pair of upstanding stanchions 180, 182 are welded to suitable ones of transverse frame members 24 and billow blocks 184, 186 are secured to the upper ends thereof with suitable threaded fasteners (not shown) with the axes of the pillow blocks being disposed horizontally perpendicular to shaft 112. A second jack shaft 190 is rotatably carried by pillow blocks 184, 186, and a second miter gear 192 is drivingly coupled threto adjacent the center thereof in engagement with miter gear 177. End 194 of jack shaft 190 extends outwardly from the end of frame 12 and has drivingly connected thereto a chain sprocket 196.

Figure 5:
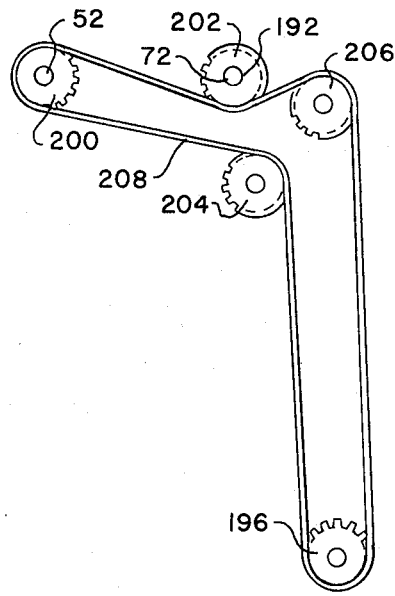
FIG. 5 is a diagrammatic illustration showing the arrangement of a portion of the drive means of the apparatus.

Referring now to FIG. 5, affixed to outwardly extending ends of shafts 50 and 72 are a pair of drive sprockets 200, 202, respectively. A pair of idler sprockets 204, 206, are rotatably mounted to end wall 42 of hopper 30, and an endless drive element 208 such as a roller chain is trained about sprockets 200 through 204 and sprocket 196 as shown. It will be observed that as sprocket 196 rotates, drive element 208 will cause shafts 50 and 72 to rotate in opposite directions. Motor 121 is drivingly coupled to jack shaft 140 (FIG. 4) via sheaves 128, 211, and endless belt 213.

It will now be observed that when motor 121 is running, it will drive jack shaft 140. Rotation of jack shaft 140 will in turn rotate vanes 114 in chamber 100 via sheaves 146, 160, endless drive element 159 and gear box 150. Similarly, the tined shafts 84, 86 will be rotated by means of sheaves 166, 168 (FIGS. 3 and 4) and belt 170, and also sprockets 164, 174, and chain 176. Because sprockets 164, 174 are of different diameters, tined shafts 84, 86 will rotate at different speeds. Rotation of drive shaft 112 will produce rotation of miter gear 177 which in turn drives miter gear 192 to rotate jack shaft 190 thereby driving sprocket 196. This in turn produces counter-rotational movement of shafts 50 and 72 as above described.

Figure 6:
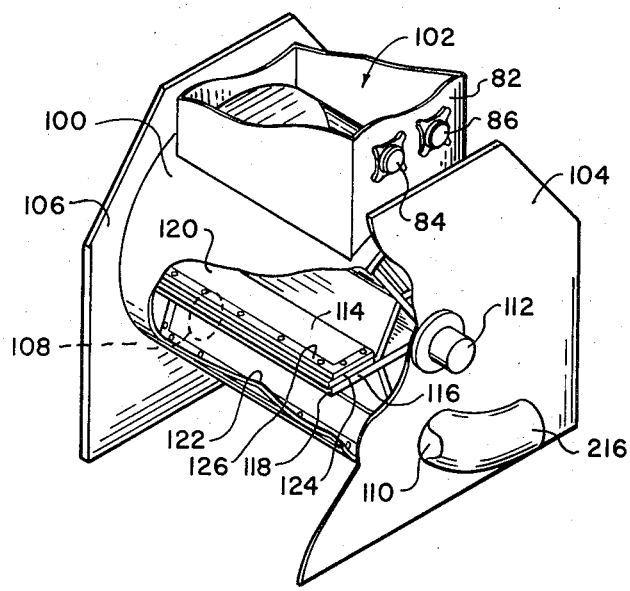
FIG. 6 is a fragmentary cut away perspective view of the air lock means.
Figure 7:
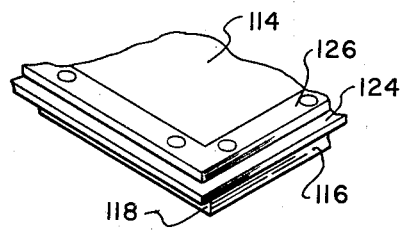
FIG. 7 is a fragmentary perspective showing details of the sealing means used in the air lock means.

Connected to pressure fluid inlet port 110 by means of an elbow coupling 216 (FIG. 6) and a flexible coupling 210 (FIGS. 1 and 6) is a pressure duct or conduit 212. The opposite end 214 of conduit 212 is connected by means of a second flexible coupling 216 to a positive displacement air blower or air compressor 218. Air compressor 218 includes an inlet duct 220 which is fitted with a suitable air filter 222. Compressor 218 is conventional and further description is not required. To provide a means for driving compressor 218 (FIG. 1) there is provided a second electric motor 224 (FIG. 3) which is drivingly coupled to compressor 218 by means of sheaves 226, 228 and a drive belt 230.

A branch conduit 234 (FIGS. 3 and 4 only) extends transversely from conduit 212, conduit 234 communicating therewith. The distal end of conduit 234 is fitted with a pressure relief valve 236. This type of valve is conventional, and it is sufficient to state that it provides a means for regulating the pressure of fluid within conduit 212 by providing for the release of fluid pressure at a predetermined selected pressure determined by the number of weights 238 placed thereon.

Conventional motor starters 240, 242 are fixedly mounted to frame corner posts 22 and are electrically connected with suitable cables to electric motors 120 and 224 and a pair of "on-off" switches 244, 246 are provided, also electrically connected to starters 240, 242 to provide for a selected operation of motors 120 and 224. The electrical wiring of "on-off" switches 244, 246, motor starters 240, 242, and electric motors 120 and 224, is conventional and the wiring is not illustrated for purposes of clarity and further description thereof is not required.

Preferably, a suitable chain guard 250 is provided to enclose sprockets 196, 200 to 204, and drive element 208. Similarly, it is preferably that the oppositely disposed sides of the frame 12 be enclosed with suitable screen or steel mesh (not shown) for reasons of safety.

As seen in FIGS. 1 and 3, a dust cover 252 is removably secured to the top of hopper 30, dust cover 252 including exhaust duct 254 which may be coupled to any suitable dust-collecting system. The open portion of hopper 30 provides a means for placing fibrous material, and in particular asbestos fibers in packed form, into the hopper 30. As shown in FIG. 1 only, a suitable conveyor 256 may be provided for automatically feeding the packed blocks 258 of fibrous material into the hopper 30. It may also be desirable to enclose conveyor 256 and the remaining open portion of hopper 30 with a closed duct (not shown) to prevent the discharge of dust into the atmosphere.

In operation, fibrous blocks 258 (FIG. 1 only) of pressure packed asbestos are loaded into the hopper 30 as indicated by arrow 260. As the material drops into the hopper 30, it is threshingly engaged by the rotating tines 66, 74 and the blades 70, 76. The rod-like ends, i.e., ends 69 of tines 66, 74 apply a shredding or disjoining force on the material to 58 in a direction perpendicular to the longitudinal dimension of the hopper 30. It will be observed that the ends 69, while they function to disjoin the material, do not exert any forces upon the material that will cause the material to move longitudinally through the hopper 30.

Simultaneously, the material 258 is subjected to shearing or shredding forces by the blades 70 affixed to the ends 68 of tines 66, 74. The rotational movement of the blades 70, 76 again subjects the material 258 to shredding or disjoining forces in a direction perpendicular to the longitudinal dimension of the hopper 30. However, by reason of the angled face surfaces 71 of the blades 70, 76, the material is also subjected to forces parallel to the longitudinal dimension of the hopper 30, these forces forcibly moving the material 258 through the hopper towards the outlet opening 80 thereof. It is thus seen that the ends of the tines 66, 74, function as a first disjoining means for forcibly separating the asbestos material in the hopper 30 but do not cause any longitudinal movement of the material 258. Conversely, the bladed ends of the tines 66, 74 function as a second disjoining means which simultaneously forcibly disjoins fibrous material 258 and forcibly moves the material 258 longitudinally through the hopper 30 towards outlet opening 80. Thus, providing the tines 66, 74 with blades 70, 76 at only one end thereof substantially increases the ability of the apparatus 10 to more fully disjoin the fibrous material in hopper 30. Specifically, it will be observed that if both ends of the tines 66, 74 were to be provided with blades such as blades 70, 76, material 258 in the hopper 30 will be caused to move therethrough at a greater speed. Correspondingly, material 258 will be subjected to disjoining forces for a shorter period of time. Conversely, by providing tines 66, 74 with ends 69 which do not have blades, the asbestos material 258 is subjected to substantially more disjoining action since the unbladed tines function only to disjoin the material and do not cause the material to move longitudinally through the hopper at a greater speed.

It will be observed that the blades 70a adjacent the outlet opening 80 (and the blades 76 on shaft 72 adjacent opening 80) are disposed at an angle nearly parallel to the axis of the shafts 50, 72, whereby these blades also act as feeder elements for forcibly driving the disjoined fibers downwardly into the duct 82. The fibrous material is now engaged by the tines of shafts 84, 86. Shafts 84, 86 are rotating at speeds substantially greater than shafts 50, 72 thereby enabling the tines 88, 90 thereof to function as a third disjoining means for further fluffing the fibrous material. The tines 88, 90 also act as feeders which forcibly move the fibrous material downwardly through the duct 82 through the inlet opening 102 of chamber 100.

It can be seen that the vanes 114 within chamber 100 divide the chamber into a plurality of rotating sub-chambers as at 100a. As each of the sub-chambers 100a passes inlet opening 102, a quantity of the fibrous material enters thereinto. As the vanes 114 continue to rotate, the material in the sub-chambers 100a is moved downwardly to a position adjacent discharge opening 108. Simultaneously, pressure fluid such as compressed air entering chamber 100 adjacent pressure fluid inlet port 110 by means of conduit 212 forcibly drives the fibrous and now disjoined material outwardly through discharge opening 108. The pressure fluid, however, is unable to escape upwardly through chamber 100 to interfere with the feeding of the material into chamber 100 by reason of the seal elements 124 on each of the vanes 114. Further, the pressure fluid provides means for further carrying the fibrous and disjoined material through an externally attached conduit or duct (not shown) to a point of use.

It will be observed that the blades 70, 76 and tines 66, 74, and the tines 88, 90 of the third disjoining means do not make physical contact. Rather, substantial clearances are provided for each of the rotating elements. This enables the blades and tines to completely disjoin the fibrous material placed into the hopper 30 but prevents the blades and tines from acting as cutters or chopping elements that might sever and reduce the length of the fibers placed into the hopper 30. Further, the second and third disjoning means provide both the function of disjoining the fibrous material and automatically force feeding same through the apparatus.

The apparatus is rugged and fully accessible thereby minimizing and facilitating servicing thereof. Further, by reason of the design of the apparatus, clogging thereof by the fibrous material is virtually eliminated. Lastly, the combination of the air lock means which includes chamber 100 and rotating vanes 114 also renders the apparatus fully suited for force feeding the disjoined and fluffed fibrous material through an external conduit or duct directly to the point of use thereof.

In a specific working embodiment of the invention, the following dimensions and parameters were used:
Hopper 30 length: 60 inches, width 44 inches, depth 16½ inches
Tines 66, 74 length: 14 inches, diameter ⅝ inch, number 14 × 2
Speed of rotation: 88 RPM
Tined shafts 84, 86 length: 22 inches, 24 inches, speed of rotation 475, RPM 1,000 RPM
Tines 88, 90 length: 7 inches, diameter ⅜ inch
Air lock means 98:
   chamber 100: diameter: 18 inches OD × 16 inches long
   shaft 112 speed of rotation: 36 RPM
Inlet port 110 diameter: 3 inches
Discharge opening 108 diameter: 5 inches
Blower 218 volume: 450, CFM, pressure; to 6 pounds Motor 120: 5 hp, speed 1,800 RPM
Motor 224: 15 hp, speed 1,800 RPM
Capacity of apparatus: 9 ton No. 7 asbestos/hr.

While there have been described above the principles of this invention in connection with specific apparatus, it is to be clearly understood that this description is made only by way of example and not as a limitation to the scope of the invention.

We claim:
1. In an apparatus for conditioning and transporting asbestos fibers, the combination comprising:
  a. a hopper having longitudinally spaced-apart inlet and outlet openings therein,
  b. two elongated shafts mounted for rotation within said hopper in parallel spaced-apart relationship, and further including means for contrarotating said shafts, first means including a first plurality of elongated tines fixedly secured to each shaft in longitudinally spaced-apart relationship and extending radially outwardly therefrom for disjoining fibrous material loaded into said hopper, second means including a second plurality of elongated tines fixedly secured to and extending radially outwardly from each shaft and a blade element fixedly secured to the distal and of each of said second plurality of tines mounted on each shaft for simultaneously disjoining said fibrous material and moving said material longitudinally through said hopper from said inlet opening to said outlet opening thereof, the longitudinal movement of said material through said hopper being unaffected by said first plurality of tines, adjacent ones of said first plurality and said second plurality of tines being orthogonally disposed and every other one of said first plurality and said second plurality of tines extending radially outwardly from said shaft in diametrically opposite directions, each of said blade elements including a generally flat face surface, said hopper outlet opening being disposed adjacent one end of said hopper, the blades secured to the ones of said second plurality of tines disposed between said outlet opening and the end of said hopper adjacent said inlet opening having said face surfaces thereof extending substantially along the surface of an imaginary screw-type conveyor having said shaft as its axis,
  c. a duct connected to said outlet opening communicating therewith, d. third means mounted within said duct for further disjoining and forcibly moving said material therethrough, e. air lock chamber means having an inlet opening coupled to receive said material from said cut, a pressure-fluid inlet port, and an outlet opening, and a plurality of vanes rotatably mounted in said chamber means for moving said material received from said duct to a point adjacent said outlet opening thereof, for preventing the passage of air from said pressure-fluid port to said inlet opening, and simultaneously, pneumatically, coupling said pressure-fluid port to said chamber outlet opening, f. a source of pressure-fluid coupled to said pressure-fluid port, g. the face surfaces of said blades secured to said two shafts extending substantially along the surfaces of imaginary screw-type conveyors spiraled in opposite directions, whereby simultaneous rotation of said one and said other shafts causes movement of said material towards said hopper outlet opening.

2. The combination of claim 1 wherein each said blade secured to a one of said second plurality of tines which is disposed in registry with said hopper outlet opening having said face surface disposed substantially parallel to said shaft.

3. The combination of claim 1 wherein said tines of said first and said second tined shafts are elongated, cylindrical rods.

* * * * *